(12) United States Patent
Ho

(10) Patent No.: US 8,791,987 B2
(45) Date of Patent: Jul. 29, 2014

(54) PORTABLE ELECTRONIC DEVICE WITH 3D IMAGE CAPTURE CAPABILITY AND IMAGE DIFFERENCE CONTROL METHOD THEREOF

(75) Inventor: Chia-Chu Ho, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 321 days.

(21) Appl. No.: 13/324,787

(22) Filed: Dec. 13, 2011

(65) Prior Publication Data

US 2013/0147924 A1    Jun. 13, 2013

(51) Int. Cl.
*H04N 13/02* (2006.01)
*H04N 13/00* (2006.01)

(52) U.S. Cl.
USPC .............................................. 348/47; 348/42

(58) Field of Classification Search
CPC ... G03B 35/08; H04N 5/232; H04N 13/0018; H04N 13/0022; H04N 13/0033; H04N 13/39; H04N 13/0404; H04N 13/0409; H04N 13/0434; H04N 13/0438
USPC ...... 348/47, 46, 42, 48, 51; 382/154
See application file for complete search history.

(56) References Cited

U.S. PATENT DOCUMENTS

| 2005/0053274 A1* | 3/2005 | Mayer et al. | 382/154 |
| 2012/0007953 A1* | 1/2012 | Sung | 348/46 |
| 2013/0258065 A1* | 10/2013 | Ego | 348/47 |

FOREIGN PATENT DOCUMENTS

| TW | 200507606 A | 2/2005 |
| TW | M416116 | 11/2011 |

* cited by examiner

*Primary Examiner* — Robert Chevalier
(74) *Attorney, Agent, or Firm* — Birch, Stewart, Kolasch & Birch, LLP

(57) ABSTRACT

A portable electronic device with 3D image capture capability and an image difference control method thereof are disclosed. The portable electronic device comprises a first and a second image capture module, a subject distance estimator and an image difference control mechanism. The first and second image capture modules are operative to capture a first image and a second image, respectively, to form a 3D image. Before image capturing, the subject distance estimator estimates a subject distance indicating how far a subject to be captured is, and the image difference control mechanism adjusts a distance between the first and second image capture modules based on the subject distance by moving at least one of the first and second image capture modules. In this manner, the image difference between the first and second images is properly controlled to perfectly form the 3D image.

9 Claims, 5 Drawing Sheets

PORTABLE ELECTRONIC DEVICE WITH 3D IMAGE CAPTURE CAPABILITY AND IMAGE DIFFERENCE CONTROL METHOD THEREOF

BACKGROUND OF THE INVENTION

1. Field of the Invention

The present invention relates to a portable electronic device with 3D image capture capability, and in particular relates to image difference control for 3D image capturing.

2. Description of the Related Art

For 3D image capturing, it generally requires two image capture modules: a first image capture module imitates the human left eye; and a second image capture module imitates the human right eye.

In conventional techniques, the first and second image capture modules, assembled in a portable electronic device with 3D, are spaced apart by a fixed distance. When a subject to be captured is very close to the device, the image difference between a first image captured by the first image capture module and a second image captured by the second image capture module may be too significant to form a 3D image.

BRIEF SUMMARY OF THE INVENTION

A portable electronic device with 3D image capture capability and an image difference control method thereof are disclosed.

A portable electronic device in accordance with an exemplary embodiment of the invention comprises a first image capture module, a second image capture module, a subject distance estimator and an image difference control mechanism. The first and second image capture modules are operative to capture a first image and a second image, respectively, to form a 3D image. Before image capturing, the subject distance estimator estimates a subject distance indicating how far a subject to be captured is, and the image difference control mechanism adjusts a distance between the first and second image capture modules based on the subject distance by moving at least one of the first and second image capture modules. In this manner, the image difference between the first and second images is properly controlled to perfectly form the 3D image.

In an exemplary embodiment, the image difference control mechanism comprises a mechanical structure, an electric motor and an electric motor controller. The mechanical structure allows at least one of the first and second image capture modules sliding and moving thereon. The electric motor is coupled to the mechanical structure to drive the sliding of the at least one of the first and second image capture modules that is moved. The electric motor controller controls the electric motor based on the subject distance.

The image difference control mechanism may further comprise a storage unit storing a look-up table to be checked by the electric motor controller based on the subject distance. By the look-up table, the shorter subject distance corresponds to a more positive value to drive the electric motor to shorten the distance between the first and second image capture modules.

In another exemplary embodiment, a method of image difference control for a portable electronic device with 3D image capture capability comprises the steps as below. According to the method, a subject distance estimator is provided to estimate a subject distance. Further, an image difference control mechanism is provided, which adjusts a distance between a first image capture module and a second image capture module of the portable electronic device based on the subject distance by moving at least one of the first and second image capture modules. After estimation of the subject distance and the adjusting of the distance between the first and second image capture modules, the first and second image capture modules are activated to capture a first image and a second image, respectively, to form a 3D image.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows several embodiments carrying out the invention. This description is made for the purpose of illustrating the general principles of the invention and should not be taken in a limiting sense. The scope of the invention is best determined by reference to the appended claims.

Figure 1:
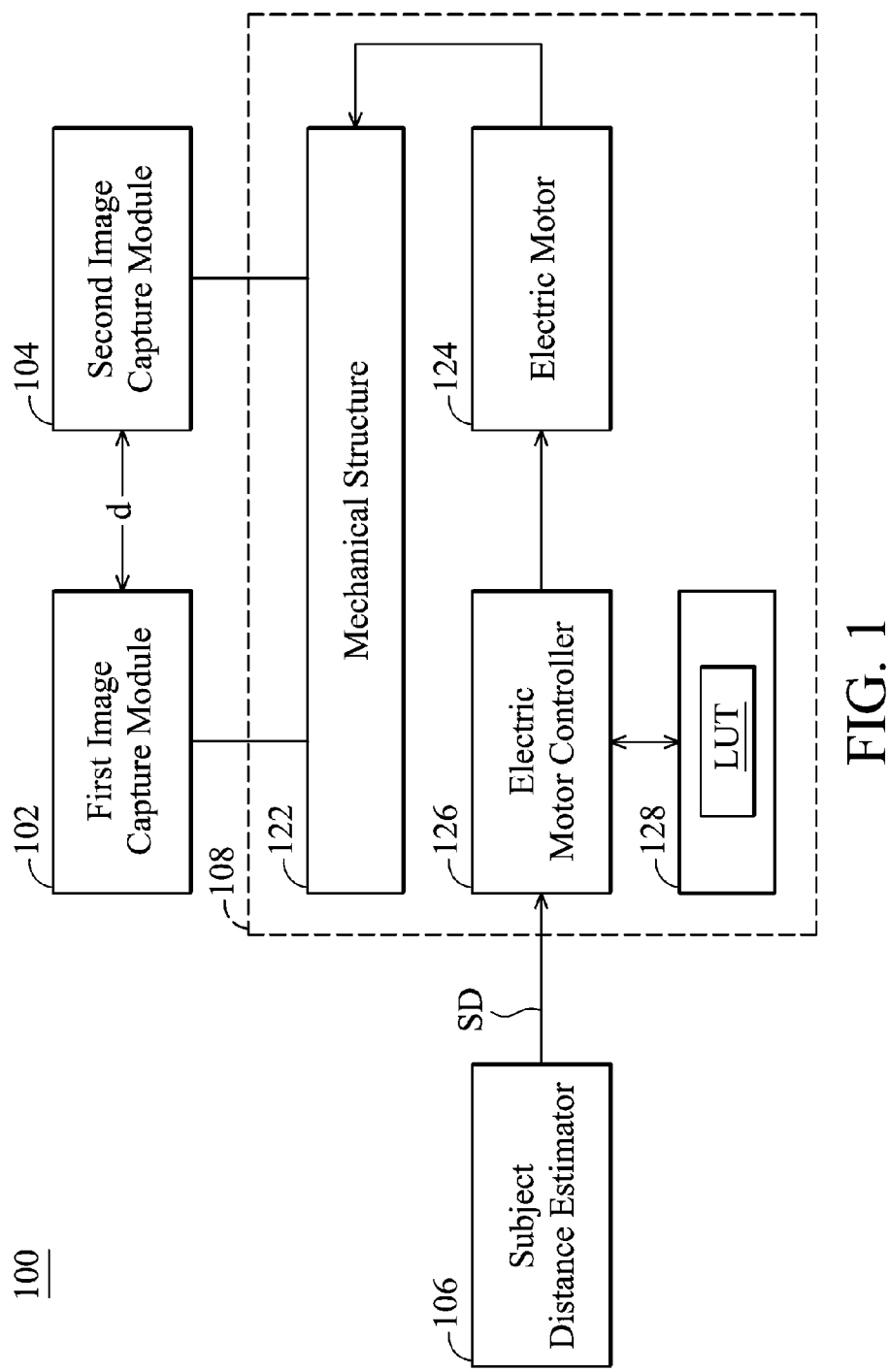
FIG. 1 depicts a portable electronic device 100 with 3D image capture capability in accordance with an exemplary embodiment of the invention.

FIG. 1 depicts a portable electronic device 100 with 3D image capture capability in accordance with an exemplary embodiment of the invention.

The portable electronic device 100 comprises a first image capture module 102, a second image capture module 104, a subject distance estimator 106 and an image difference control mechanism 108.

The first and second image capture modules 102 and 104 are operative to capture a first image and a second image, respectively, to form a 3D image. Before image capturing, the subject distance estimator 106 estimates a subject distance SD indicating how far a subject to be captured is, and the image difference control mechanism 108 adjusts a distance d between the first and second image capture modules 102 and 104 based on the subject distance SD. The image difference control mechanism 108 may move at least one of the first and second image capture modules 102 and 104 to implement the adjusting of the distance d. In this manner, the image difference between the first and second images is properly controlled to perfectly form the 3D image.

Figure 2:
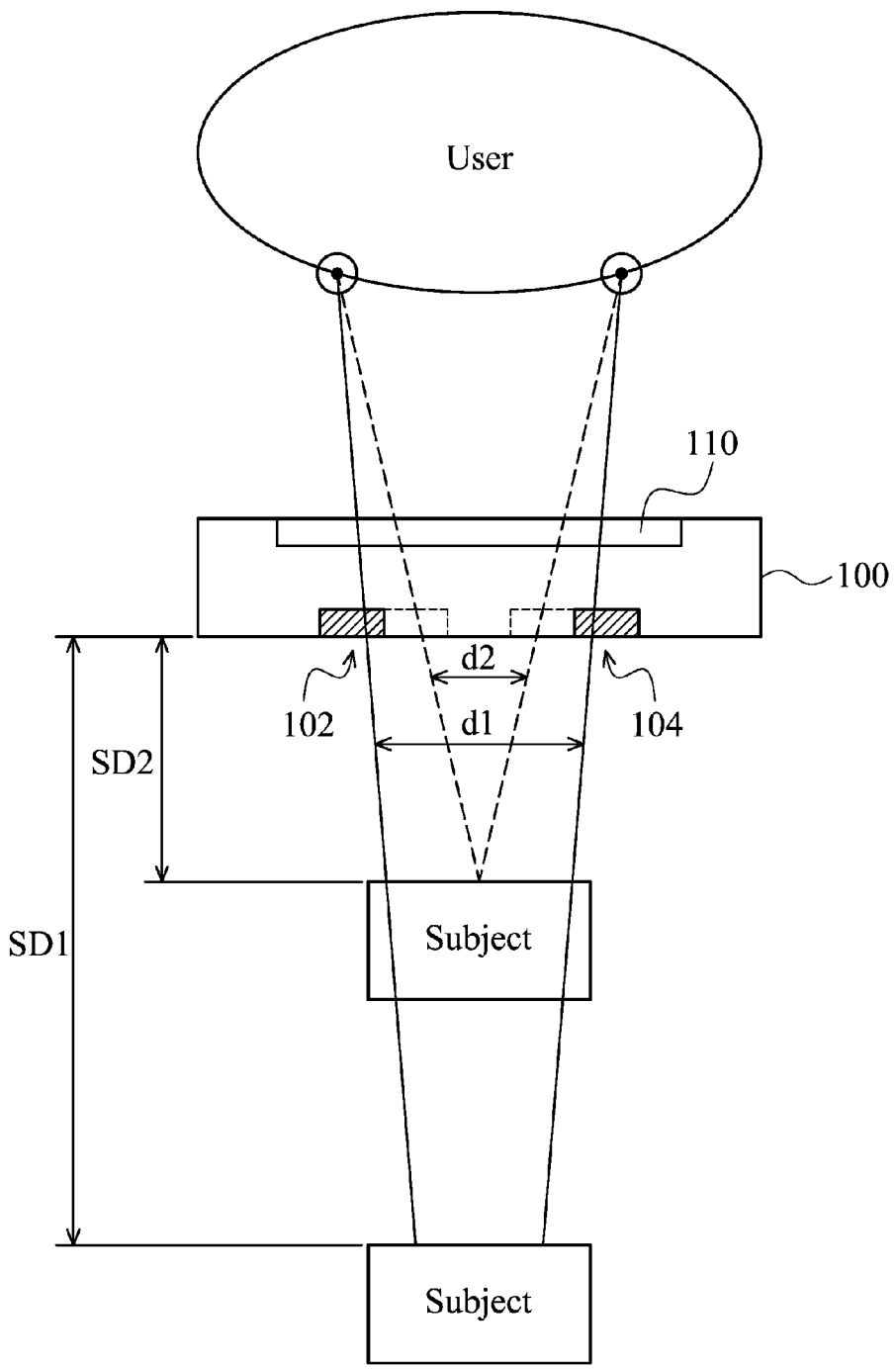
FIG. 2 shows the disclosed distance adjustment between the first and second image capture modules 102 and 104 when a subject to be captured is moved from a farther distance SD1 to a closer distance SD2.

FIG. 2 shows the disclosed distance adjustment between the first and second image capture modules 102 and 104 when a subject to be captured is moved from a farther distance SD1 to a closer distance SD2. In this embodiment, the portable electronic device 100 further comprises an image display 110, instantly displaying the captured 3D image for the user. As shown, the distance adjustment between the first and second image capture modules 102 and 104 creates a comfortable 3D viewing experience for the user. When the subject to be captured is at the farther distance SD1, the first and second image capture modules (referring to the solid ones) are spaced apart by a longer distance d1. When the subject to be captured is at the closer distance SD2, the first and second image capture modules (referring to the dotted ones) are spaced apart by a shorter distance d2. Referring back to FIG. 1, the image difference control mechanism 108 may lengthen the distance d between the first and second image capture modules 102 and 104 as the subject distance SD increases, and shorten the distance d between the first and second image capture modules 102 and 104 as the subject distance SD decreases.

In an exemplary embodiment, the subject distance estimator 106 is a distance sensor, such as an infrared sensor, an ultrasonic sensor, and so on, or, in another exemplary embodiment, the subject distance estimator 106 is implemented by an auto-focus module which estimates the subject distance SD when obtaining a proper focal length between a lens and an image sensor array.

Further, the image difference control mechanism 108 may comprise a mechanical structure 122, an electric motor 124, an electric motor controller 126 and a storage unit 128. The at least one of the first and second image capture modules which is moved, 102 or 104 or both, slide on the mechanical structure 122. The electric motor 124 is coupled to the mechanical structure 122 to drive the sliding of the at least one of the first and second image capture modules which is moved (102 or 104 or both). The electric motor controller 126 controls the electric motor 124 based on the subject distance SD. In the embodiment of FIG. 1, the storage unit 128 stores a look-up table LUT to be checked by the electric motor controller 126 based on the subject distance SD. By the look-up table LUT, the shorter subject distance corresponds to a more positive value to drive the electric motor 124 to shorten the distance d between the first and second image capture modules 102 and 104. In another exemplary embodiment, the electric motor controller 126 executes a calculation, rather than checking the look-up table LUT, to obtain the value to control the electric motor 124.

In an exemplary embodiment, the mechanical structure 122 is a slide, and the electric motor 124 may be a stepping motor, an ultrasonic motor, and so on.

Figure 3:
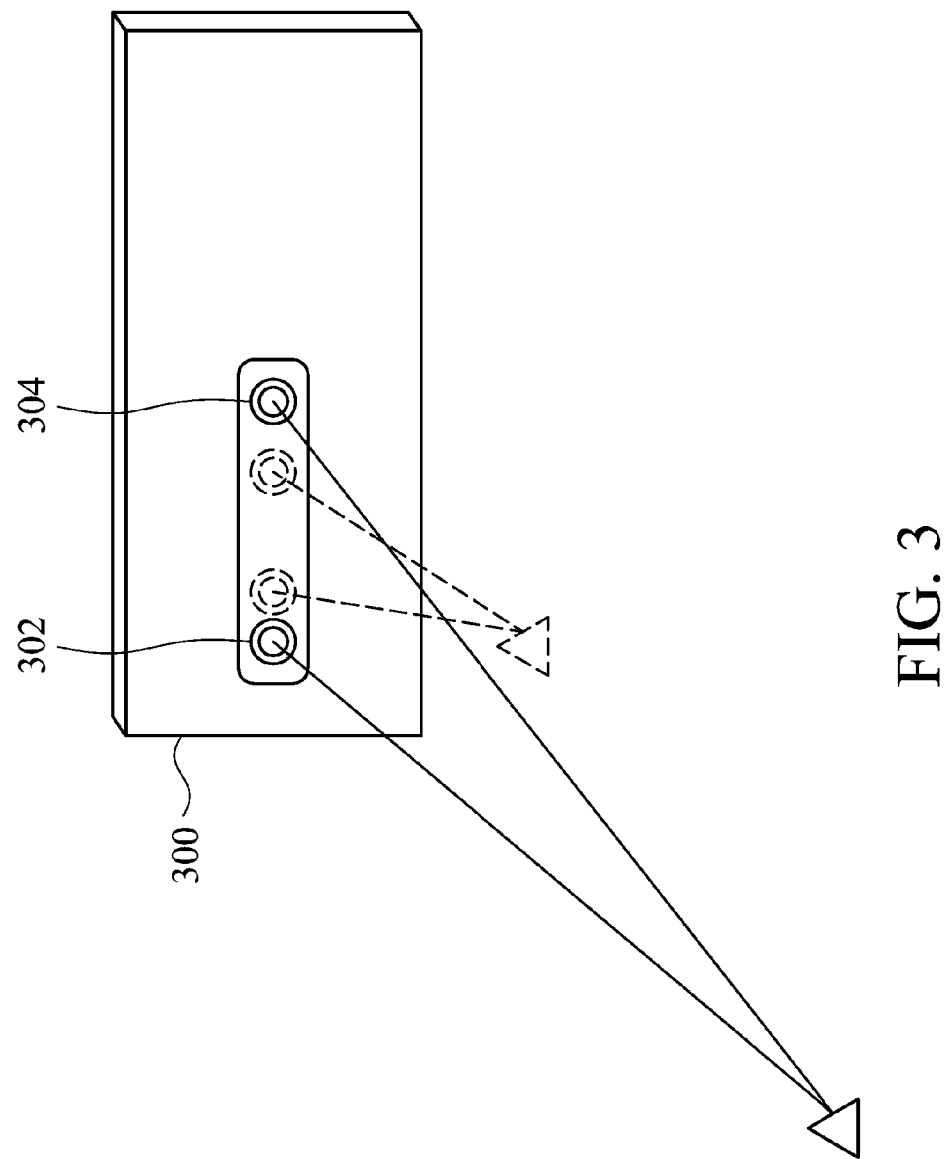
FIG. 3 shows a smart phone 300 with the disclosed 3D image capture technology.

The disclosed portable electronic device may be a smart phone. FIG. 3 shows a smart phone 300 with the disclosed 3D image capture technology. In this embodiment, the first and second image capture modules 302 and 304 have separate lenses and separate image sensor arrays. When moving an image capture module, the lens and the sensor array thereof are moved together.

Figure 4:
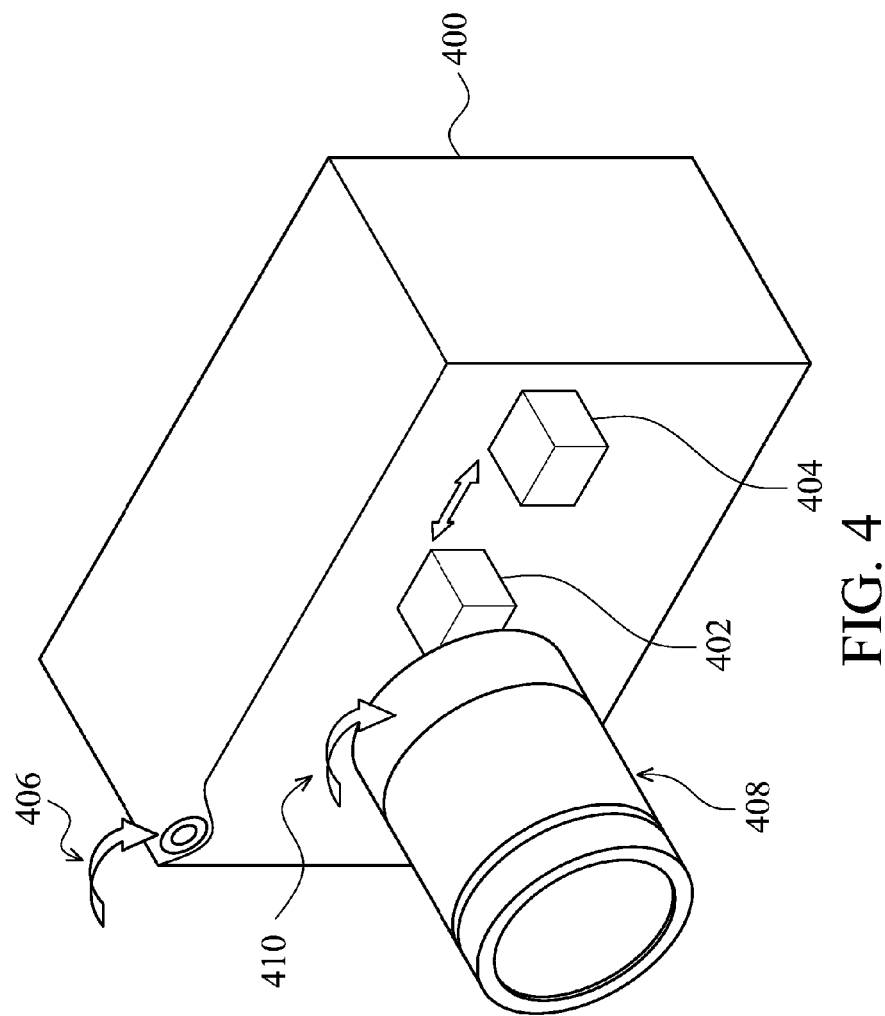
FIG. 4 shows an SLR camera 400 with the disclosed 3D image capture technology.

In another exemplary embodiment, the disclosed portable electronic device may be an SLR camera. FIG. 4 shows an SLR camera 400 with the disclosed 3D image capture technology. In this embodiment, the first and second image capture modules 402 and 404 represent two image sensor arrays sensing separate images to imitate the human left and right eyes. By lightly pressing a shoot button (406) for automatically obtaining the focal length between the lens 408 and the first and second image capture modules 402 and 404, a subject distance is obtained, and the distance between the first and second image capture modules 402 and 404 is adjusted accordingly to meet the magnitude of the subject distance. In another case wherein the focal length is obtained manually (e.g., by rotating a focus ring on the lens 408, as indicated by number 410), a subject distance is obtained by the manual focus procedure, and the distance between the first and second image capture modules 402 and 404 is adjusted accordingly to meet the magnitude of the subject distance.

Figure 5:
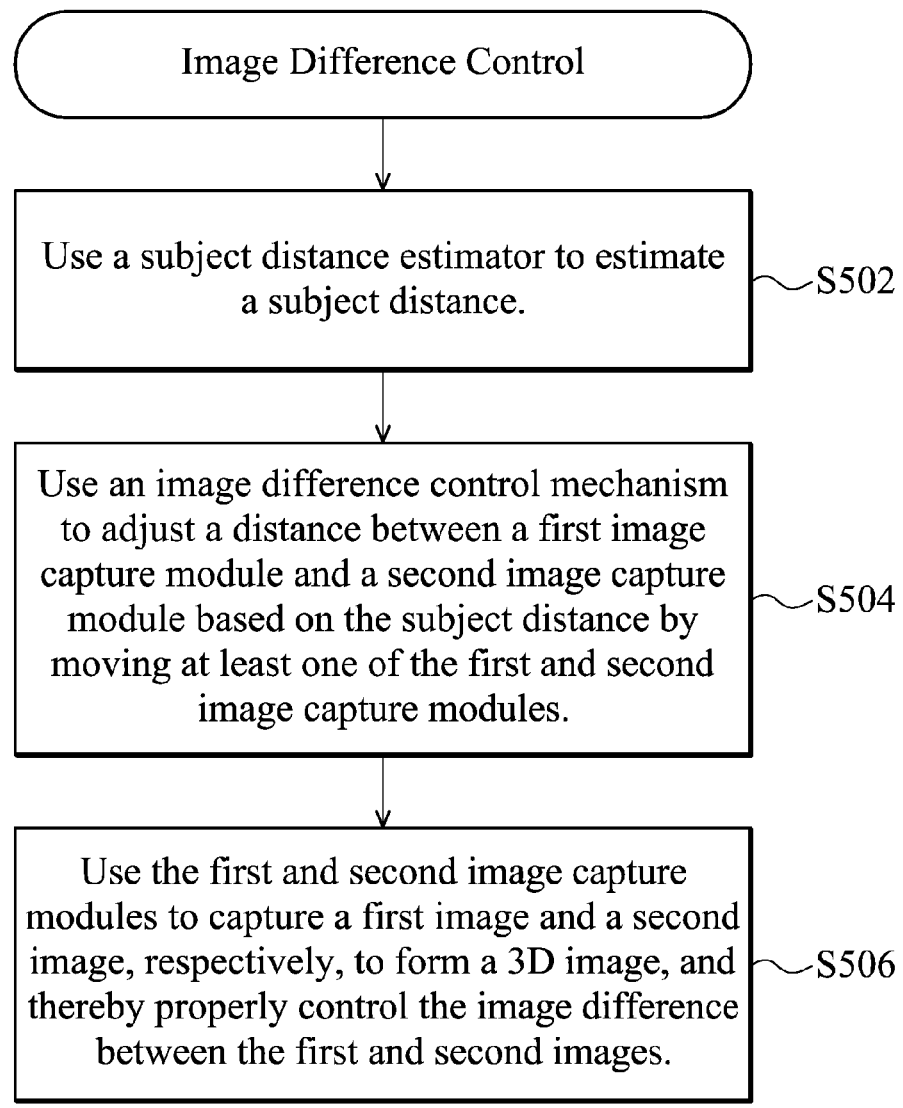
FIG. 5 is a flowchart depicting a method of image difference control for a portable electronic device with 3D image capture capability.

FIG. 5 is a flowchart depicting a method of image difference control for a portable electronic device with 3D image capture capability. The portable electronic device may be as shown in FIG. 1. In step S502, the subject distance estimator 106 estimates a subject distance SD. In step S504, the image difference control mechanism 108 adjusts a distance d between a first image capture module 102 and a second image capture module 104 based on the subject distance SD by moving at least one of the first and second image capture modules 102 and 104. After estimation of the subject distance SD (S502) and the adjusting of the distance d between the first and second image capture modules 102 and 104 (S504), step S506 is performed. In step S506, the first and second image capture modules 102 and 104 are activated to capture a first image and a second image, respectively, to form a 3D image. In this manner, the image difference between the first and second images is properly controlled to form the 3D image.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A portable electronic device with 3D image capture capability, comprising:
   a first image capture module and a second image capture module;
   a subject distance estimator, estimating a subject distance; and
   an image difference control mechanism, adjusting a distance between the first and second image capture modules based on the subject distance by moving at least one of the first and second image capture modules,
   wherein;
   the first and second image capture modules capture a first image and a second image, respectively, to form a 3D image after the image difference control mechanism adjusts the distance between the first and second image capture modules; and
   the image difference control mechanism comprises:
      a mechanical structure, on which the at least one of the first and second image capture modules which is moved slides;
      an electric motor, coupled to the mechanical structure to drive the sliding of the at least one of the first and second image capture modules which is moved;
      an electric motor controller, controlling the electric motor based on the subject distance; and
      a storage unit storing a look-up table to be checked by the electric motor controller based on the subject distance and, by the look-up table, the shorter subject distance corresponds to a more positive value to drive the electric motor to shorten the distance between the first and second image capture modules.

2. The portable electronic device as claimed in claim 1, wherein the image difference control mechanism lengthens the distance between the first and second image capture modules as the subject distance increases, and shortens the distance between the first and second image capture modules as the subject distance decreases.

3. The portable electronic device as claimed in claim 1, wherein the subject distance estimator is a distance sensor.

4. The portable electronic device as claimed in claim 1, wherein the subject distance estimator is implemented by an auto-focus module.

5. The portable electronic device as claimed in claim 1, further comprising an image display for displaying the 3D image.

6. A method of image difference control for a portable electronic device with 3D image capture capability, comprising:
   providing a subject distance estimator to estimate a subject distance;
   providing an image difference control mechanism which adjusts a distance between a first image capture module and a second image capture module of the portable electronic device based on the subject distance by moving at least one of the first and second image capture modules; and
   using the first and second image capture modules to capture a first image and a second image, respectively, to form a 3D image,
   wherein the image difference control mechanism comprises:
   a mechanical structure, on which the at least one of the first and second image capture modules which is moved slides;
   an electric motor, coupled to the mechanical structure to drive the sliding of the at least one of the first and second image capture modules which is moved;
   an electric motor controller, controlling the electric motor based on the subject distance; and
   a storage unit storing a look-up table to be checked by the electric motor controller based on the subject distance and, by the look-up table, the shorter subject distance corresponds to a more positive value to drive the electric motor to shorten the distance between the first and second image capture modules.

7. The method as claimed in claim 6, wherein the image difference control mechanism lengthens the distance between the first and second image capture modules as the subject distance increases, and shortens the distance between the first and second image capture modules as the subject distance decreases.

8. The method as claimed in claim 6, wherein the subject distance estimator is a distance sensor.

9. The method as claimed in claim 6, wherein the subject distance estimator is implemented by an auto-focus module.

* * * * *